(12) United States Patent
Calzada

(10) Patent No.: US 6,521,002 B2
(45) Date of Patent: Feb. 18, 2003

(54) TRANSPARENT CLEAR CANDLE

(75) Inventor: Jose Francisco Calzada, Mixco (GT)

(73) Assignee: Xanadu Candle International Limited, Road Town Tortola (VG)

(*) Notice: Subject to any disclaimer, the term of this patent is extended or adjusted under 35 U.S.C. 154(b) by 0 days.

(21) Appl. No.: 09/728,132

(22) Filed: Dec. 1, 2000

(65) Prior Publication Data

US 2002/0100209 A1 Aug. 1, 2002

Related U.S. Application Data

(60) Provisional application No. 60/168,534, filed on Dec. 2, 1999.

(51) Int. Cl.⁷ .................................................. C11C 5/00
(52) U.S. Cl. ......................................... 44/275; 431/288
(58) Field of Search ............................. 44/275; 431/288

(56) References Cited

U.S. PATENT DOCUMENTS 3,645,705 A * 2/1972 Miller ......................... 44/275
3,819,342 A * 6/1974 Gunderman ................. 44/275
4,332,548 A * 6/1982 Linton ......................... 44/275

* cited by examiner

*Primary Examiner*—Cephia D. Toomer
(74) *Attorney, Agent, or Firm*—Robert M. Schwartz

(57) ABSTRACT

A clear transparent candle, which can be scented, is made of a novel composition comprising at least one polyamide resin; at least one aliphatic acid alkyl ester having 16 to 40 carbon atoms total in the acid and alcohol moieties thereof; at least one unsaturated alcohol having 11 to 20 carbon atoms; at least one polyether diol ester; at least one drying agent selected from the group consisting of saturated alcohols having 14 to 22 carbon atoms, fatty acid amides, and fatty acid bis-amides in specified ranges of proportions, 0 to 3 parts by weight of at least one emulsifier, 0 to 10 parts by weight of at least one fragrance and 0 to 1 part by weight of at least one preservative. The candle can stand alone or be in a container.

28 Claims, No Drawings

TRANSPARENT CLEAR CANDLE

CROSS-REFERENCE TO RELATED APPLICATIONS

This application claims the benefit of U.S. Provisional Patent Application No. 60/168,534 filed Dec. 2, 1999.

BACKGROUND OF THE INVENTION

This invention relates to a clear candle and to a novel composition for its preparation.

A conventional candle is made from beeswax and/or petroleum paraffin to which fragrance can be added. More recently, hydrocarbon gels, gelling agents with oil, and polyamide gelling agents have been disclosed as candle base materials.

Polyamide candles have been disclosed in U.S. Pat. Nos. 3,615,289, 3,645,705, and 3,819,342). A low molecular weight, ester-terminated polyamide blended with a liquid hydrocarbon to form a transparent composition having gel consistency and also useful as a candle bese material was disclosed in U.S. Pat. No. 5,783,657. However, the results show a sticky surface and low resistance to shear stresses.

U.S. Pat. No. 5,882,363 has taught the use of certain polyamide resins in combination with one or more 12-hydroxystearic acid ester solvents. In this case, the mechanical properties are better, but the burning presents a poor performance, with the formation of black pools and drowning of the wick. There remains a need for an improved candle composition to obtain better burning, no stickiness and improved mechanical properties.

SUMMARY OF THE INVENTION

In accordance with this invention, there is provided, in order to overcome the disadvantages and drawbacks of the prior art summarized above, a clear transparent candle comprising a wick and a novel clear transparent combustible candle composition comprising 30–55 parts by weight of at least one polyamide resin, 5–45 parts by weight of at least one aliphatic acid alkyl ester having 16 to 40 carbon atoms total in the acid and alcohol moieties thereof; 10 to 30 parts of at least one unsaturated alcohol having 11 to 24 carbon atoms; 10 to 30 parts of at least one polyether diol ester; 5 to 15 parts by weight of at least one drying agent selected from the group consisting of saturated alcohols having 14 to 22 carbon atoms, fatty acid amides, and fatty acid bis-amides, 0 to 5 parts by weight of at least one emulsifier, 0 to 10 parts by weight of at least one fragrance and 0 to 1 part by weight of at least one preservative. In the proportions indicated, the components of the composition cooperate in solubilizing and compatibillzing one another and thus afford a rigid and clean burning candle that is clear and transparent and dry to the touch.

A candle according to the invention can be presented as a stand alone candle (a so-called "pillar" candle) or as a candle in a container.

In a pillar candle according to the invention, the novel clear transparent combustible candle composition preferably comprises 40–55 parts by weight of at least one polyamide resin, 5–30 parts by weight of at least one aliphatic acid alkyl ester having 16 to 40 carbon atoms total in the acid and alcohol moieties thereof; 10 to 30 parts of at least one unsaturated alcohol having 11 to 20 carbon atoms; 10 to 20 parts of at least one polyether diol ester; 5 to 15 parts by weight of at least one drying agent selected from the group consisting of saturated alcohols having 14 to 22 carbon atoms, fatty acid amides, and fatty acid bis-amides, 0 to 3 parts by weight of at least one emulsifier, 0 to 10 parts by weight of at least one fragrance and 0 to 1 part by weight of at least one preservative.

In a container candle according to the invention, the novel clear transparent combustible candle composition preferably comprises 30–45 parts by weight of at least one polyamide resin, 30–45 parts by weight of at least one aliphatic acid alkyl ester having 16 to 40 carbon atoms total in the acid and alcohol moieties thereof; 10 to 30 parts of at least one unsaturated alcohol having 11 to 20 carbon atoms; 10 to 30 parts of at least one polyether diol ester; 5 to 15 parts by weight of at least one drying agent selected from the group consisting of saturated alcohols having 14 to 22 carbon atoms, fatty acid amides, and fatty acid bis-amides, 0 to 3 parts by weight of at least one emulsifier, 0 to 10 parts by weight of at least one fragrance and 0 to 1 part by weight of at least one preservative.

The terms "clear" and "transparent" are used with their conventional meanings to indicate that object placed behind or within a candle (for example the wick or a decorative icon) can be discerned by a viewer. The term "visually compatible" is used to indicate that the combustible composition of the invention is clear and transparent as defined.

The term "dimer acid" is used to designate a known product obtained under dimerization conditions from unsaturated fatty acids having 15 to 21 carbon atoms, such as oleic acid, linoleic acid, and linolenic acid, and containing predominantly dicarboxylic acids having 30 to 42 carbon atoms, along with minor amounts of monocarboxylic acids and tricarboxylic acids.

The dimer acid based polyamide resin can be a neutral or slightly acidic (i.e. not amine-terminated) polyamide having a molecular weight in the range from 1000 to about 60000 daltons, as obtained, for example, from the polymerization of a diamine with one or more dicarboxylic acids of which at least one is dimer acid as defined. Dicarboxylic acids which can be included in the polyamide according to the invention include oxalic acid, succinic acid, glutaric acid, adipic acid, 2-methylglutaric acid, azelaic acid, sebacic acid, isophthalic acid, and terephthalic acid. Diamines which can be included in the polyamide according to the invention include ethylenediamine, propylene-1,2-diamine, 1,6-diaminohexane, piperazine, N,N'-bis(2-aminoethyl) piperazine, and ether-interrupted alkylenediamines such as the polyoxyalkylenediamines disclosed, for example, in U.S. Pat. No. 6,077,900 here incorporated by reference.

DESCRIPTION OF PREFERRED EMBODIMENTS

In a preferred embodiment, the dimer acid based first polyamide resin ingredient of the shell composition according to the invention has the formula R—CO(NH—R'—NHCO—D—CO)n-NH—R'—NH—CO—R, in which n is a number from 1 to 20;

R independently at each occurrence is a saturated or unsaturated aliphatic group having 7 to 25 carbon atoms, and particularly an aliphatic group having 11 to 19 carbon atoms, or a cycloaliphatic group having 5 to 36 carbon atoms, and is terminated by a hydrogen atom (H)or a carboxyl group (COOH);

D independently at each occurrence is an aliphatic or cycloaliphatic residue of a dicarboxylic acid having 2 to 54 carbon atoms, provided that in at least one occurrence D is the hydrocarbon moiety of dimer acid; and R' independently at each occurrence is a hydrocarbylene group having 2 to 12 carbon atoms or a chain of such hydrocarbylene groups alternating with ether oxygen groups.

Aliphatic R groups are saturated or unsaturated, for example, n-butyl, isobutyl, sec-butyl, n-hexyl, n-heptyl, 2-ethylhexyl, isooctyl, isodecyl, 3,5,5-trimethylhexyl, n-decyl, n-dodecyl, 2-butyloctyl, 10-undecenyl, oleyl, cetyl, stearyl, isostearyl, behenyl, and mixtures thereof.

Cycloaliphatic R groups are sacurated or unsaturated, for example, cyclopentyl, cyclohexyl, 4-t-butylcyclohexyl, cholesteryl, cholestanyl, and R groups derived from other steroid and terpenoid alcohols.

D, the hydrocarbon moiety of dimer acid, is believed to be represented by a six carbon ring to which are attached two aliphatic groups each terminating in a methyl group and two aliphatic groups each terminating in a carboxyl group, and can contain 0–3 carbon-carbon double bonds.

R' is the hydrocarbylene or bivalent hydrocarbon moiety of an aliphatic or cycloaliphatic diamine and is, for example, ethylene (i.e. —$CH_2$—$CH_2$—, the hydrocarbon moiety of 1,2-diaminoethane), 1,2-propylene, 1,3-propylene, hexamethylene (hexane-1,6-diyl), dodecamethylene, 3,5,5-trimethylcyclohexane-1,3-diyl (the hydrocarbon moiety of isophoronediamine), and mixtures thereof.

In a particularly preferred embodiment the diamine-dimer acid based polyamide resin is based on dimer acid that is at least partially hydrogenated, such that in at least one occurrence D is a hydrogenated hydrocarbon moiety of dimer acid.

Diamine-dimer acid based polyamide resins useful in the transparent candle composition of the invention are commercially available, for example, from Arizona Chemical Co., Wayne, N.J., under the trade name Uni-Rez and from Cognis Co. Inc., Ambler, Pa., under the trade name Versamid. Diamine-dimer acid polyamide resins based on hydrogenated dimer acid are available from Cognis Co. Inc. under the trade name Versamid 2000 series, including a resin with that name and a resin called Versamid 2001 stated to be modified for greater flexibility.

The aliphatic ester component of the candle composition of the invention has from 16 to 40 total carbon atoms distributed in the alcohol and carboxylic acid moieties of the ester such that the alcohol moiety has at least one carbon atom and the carboxylic acid moiety has at least two carbon atoms. The ester can be liquid or solid at ambient temperature. The alcohol moiety as well as the carboxylic acid moiety can be saturated or unsaturated, branched or straight chain. Preferred esters include, for example, ethyl myristate, methyl oleate, isopropyl palmitate, butyl stearate, 2-ethylhexyl laurate, 3,5-trimethyl neodecanoate, isodecyl undecylenate, 2-hexyldecyl acetate, cetyl palmitate, oleyl oleate, and stearyl stearate. The unsaturated alcohol component of the candle composition has from 11 to 24 carbon atoms, preferably from 14 to 22 carbon atoms. Preferred unsaturated alcohols include, for example, palmitoleyl alcohol, oleyl alcohol, and erucyl alcohol.

The polyether diol ester component of the candle composition has a plurality of ether groups and 1–2 esterifying carboxylic acid groups preferably having at least 10 carbon atoms. This ester can be liquid or solid at ambient temperature. Preferred polyether diol esters include, for example, tripropylene glycol dioleate, polyethylene glycol monoiaurate, polyethylene glycol monostearate, and polypropylene glycol monostearate.

The drying agent component of the candle composition is a solid at ambient temperature and preferably at 35° C. or higher. Preferred saturated alcohol drying agents have from 1 to 2 alcoholic hydroxyl groups and a straight chain or branched structure. Particularly suitable examples include myristyl alcohol, cetyl alcohol, stearyl alcohol, isostearyl alcohol, tetradecane-1,14-diol, octadecane-1,2-diol, and octadecane-1,12-diol. Preferred fatty amide and bis-amide drying agents can be saturated or unsaturated and include, for example, oleamide, stearamide, erucamide, methylenebis-stearamide, N,$N^1$-ethylenebis-oleamide, N,$N^1$-ethylenebis-stearamide, and 1,6-bis(stearamido) hexane.

Emulsifiers when present are preferably nonionic and include, for example, glyceryl monooleate, glyceryl monostearate, propylene glycol monooleate, sorbitan monolaurate, and ethoxylated alcohols, sorbitan esters, amides, and alkylpheriols with 4–24 ethylene oxide units.

Fragrance when present can be such as is perceptible when the candle is exposed to the atmosphere or such as is only perceived when released from the composition by heat as the candle burns. It is a feature of the invention that the low inherent odor level characterizing the selected ingredients of the composition facilitates the provision of candles with agreeable odor characteristics even without scent while permitting the use of any desired fragrance without clashing with an inherent odor of the unscented composition. For the purpose of this invention, fragrance also includes material classified as flavor, which can be natural or synthetic in origin. Suitable natural and synthetic fragrance/flavor substances include those compiled by the US Food and Drug Administration in Title 21 of the Code of Federal Regulations, Sections 172.510 and 172.515 respectively. Particularly suitable fragrances include basil, bergamot, citrus, jasmine, lemongrass, rosemary, and vanilla. When present, the proportion of fragrance in the composition is determined by the strength of the particular fragrance to be used, and is generally in the range from 0.1 to 10% by weight, preferably from 0.5 to 5% by weight.

Oxidation inhibitor and/or ultraviolet absorber when present can be odorless or possess an agreeable odor. Suitable oxidation inhibitors include Vitamin C ascorbic acid and Vitamin E tocopherol as natural prototypes of the category, as well as the vitamin-inactive isomer erythorbic acid, oxy-acids of phosphorus such as phosphoric acid and polyphosphoric acid, aliphatic hydroxypolycarboxylic acids such as citric acid, malic acid, and tartaric acid, EDTA and its sodium and calcium salts, and alkyl-substituted phenols such as BHT, BHA, thymol, carvacrol, 4,4'-butylidenebis (2-t-butyl-5-methylphenol), 1,1,3-tris(2-methyl-4-hydroxy-5-t-butylphenyl)butane and 3,5-di-t-butyl-4-hydroxyphenylpropionic acid and its esters with C1–C18 monohydric alcohols or 2–6 functional polyhydric alcohols. Suitable ultraviolet absorbers absorb radiation in the range of wavelengths from about 270 nm to about 400 nm and include salicylic acid esters, 2-hydroxy-4-alkoxybenzophenones, and substituted derivatives of 2 (2'-hydroxy-5'-alkylphenyl)benzotriazole. When present, the proportion of oxidation inhibitor and/or ultraviolet absorber is generally in the range from 0.005% to 1% by weight, preferably from 0.01% to 0.5%.

The combustible candle composition can include such additional visually compatible ingredients as do not adversely affect its favorable odor and burning properties, particularly colorants such as oil soluble dyes. For a comprehensive disclosure of soluble dyes with sufficient thermal stability for use in plastics and therefore also in combustible candle compositions according to this invention, reference can be made to Chapter 65-Colors, Dyes (pages 913–919) in "Plastics Additives and Modifiers Handbook", J. Edenbaum (ed.), Van Nostrand Reinhold, New York 1992, herein incorporated by reference.

In the manufacture of candles according to this invention, a wick can be placed in a suitable mold and surrounded by the combustible candle composition of the invention, usually as a melt, to afford a molded candle which can then be removed from the mold after cooling. Alternatively, a hole can be drilled into the shaped candle after melding, cooling, and solidification, and the wick inserted into the hole. Any convenient wick can be used with preference given to wicks that burn without generating unpleasant odors. Wicks of cellulose fibers such as cotton are preferred.

Candles according to this invention can be used standing free, as in candlesticks and candelabras, or in suitable containers such as glass, ceramic, or plastic vases. Any container of the finished candle can also serve as the mold in which the combustible composition is brought together with the wick.

The following Examples illustrate the invention without limiting its scope as defined by the appended claims. All parts are by weight.

EXAMPLES 1–3

To prepare free-standing ("pillar") candles, the ingredients of the candle compositions shown below were charged to a heated mixing vessel and warmed with stirring until a homogeneous melt was obtained. The melt was then discharged into metal candle molds each containing a cotton wick, allowed to cool and solidify, and removed.

The ingredients of the compositions given in parts by weight were as follows:

| Example | 1 | 2 | 3 |
|---|---|---|---|
| POLYAMIDE blend (note 1) | 35 | 30 | 50 |
| Hydrogenated dimer acid based polyamide resin (note 2) | 10 | 15 | none |
| 2-ethylhexyl stearate | 18 | none | 17 |
| 2-ethylhexyl laurate | none | 18 | none |
| oleyl alcohol | 12 | 12 | 10 |
| polypropylene glycol monostearate | 12 | 12 | 10 |
| fatty acid bis-amide m.p. ca 120° C. (note 3) | 5 | 5 | none |
| Hydroxyoctadecyl alcohol (note 4) | none | none | 5 |
| Fragrance | 5 | 5 | 5 |
| Polysorbate 60 (emulsifier) | 1.5 | 1.5 | 1.5 |
| BHT Antioxidant | 0.005 | 0.005 | 0.005 |
| Ultraviolet absorber | 0.1 | 0.1 | 0.1 |

Note 1: Mixture of Versamid 2000 series polyamides based on hydrogenated dimer acid, Cognis Corp.

Note 2: Versamid 2001, Cognis Corp.

Note 3: Kemamid W-20, Witco Corp.

Note 4: Sovamol 912, Cognis Corp.

Free standing candles were prepared from each of the above compositions.

EXAMPLES 4–6

To prepare container candles, the ingredients of the candle compositions shown below were charged to a heated mixing vessel and warmed with stirring until a homogeneous melt was obtained. The melt was then discharged into glass vase candle molds each containing a cotton wick, allowed to cool and solidify, and allowed to remain in the molds for ultimate use.

The ingredients of the compositions given in parts by weight were as follows:

| Example | 4 | 5 | 6 |
|---|---|---|---|
| Hydrogenated dimer acid based polyamide resin (note 1) | 35 | 35 | 35 |
| 2-ethylhexyl stearate | 28 | 28 | none |
| isotridecyl stearate | none | none | 28 |
| oleyl alcohol | 12 | 12 | 12 |
| polypropylene glycol monostearate | 12 | 12 | 12 |
| fatty acid bis-amide m.p. ca 120° C. (note 2) | 5 | 5 | none |
| Hydroxyoctadecyl alcohol (note 4) | none | none | 5 |
| Fragrance | 5 | 5 | 5 |
| Polysorbate 60 (emulsifier) | 1.5 | 1.5 | 1.5 |
| BHT Antioxidant | 0.005 | 0.005 | 0.005 |
| Ultraviolet absorber | 0.1 | 0.1 | 0.1 |

Note 1: Versamid 2001, Cognis Corp.

Note 2: Kemamide W-20, Witco Corp.

Note 3: Sovamol 912, Cognis Corp.

What is claimed is:

1. A free standing clear transparent candle comprising a wick and a clear transparent combustible candle composition comprising 40–55 parts by weight of at least one polyamide resin, 5–30 parts by weight of at least one aliphatic acid alkyl ester having 16 to 40 carbon atoms total in the acid and alcohol moieties thereof; 10 to 30 parts by weight of at least one unsaturated alcohol having 11 to 20 carbon atoms; 10 to 20 parts by weight of at least one polyether diol ester; 5 to 15 parts by weight of at least one drying agent selected from the group consisting of saturated alcohols having 14 to 22 carbon atoms, fatty acid amides, and fatty acid bis-amides, 0 to 3 parts by weight of at least one emulsifier, 0 to 10 parts by weight of at least one fragrance and 0 to 1 part by weight of at least one preservative.

2. The candle of claim 1 in which the polyamide resin has the formula R—CO(NH—R'—NHCO—D—CO)n-NH—R'—NH—CO—R, in which n is a number from 1 to 20;

D independently at each occurrence an aliphatic or cycloaliphatic residue of a dicarboxylic acid having 2 to 54 carbon atoms, provided that in at least one occurrence D is the hydrocarbon moiety of dimer acid;

R' independently at each occurrence is a hydrocarbylene group having 2 to 12 carbon atoms, and R independently at each occurrence is a saturated or unsaturated aliphatic group having 7 to 25 carbon atoms or a cycloaliphatic group having 5 to 36 carbon atoms, and is terminated by a hydrogen atom (H)or a carboxyl group (COOH).

3. The candle of claim 2 in which R is an aliphatic group having 11 to 19 carbon atoms.

4. The candle of claim 2 in which R' is —CH2—CH2—.

5. The candle of claim 2 in which D in at least one occurrence is a hydrogenated hydrocarbon moiety of dimer acid.

6. The candle of claim 1 in which said aliphatic ester is 2-ethylhexyl stearate.

7. The candle of claim 1, in which said unsaturated alcohol is oleyl alcohol.

8. The candle of claim 1, in which said polyether diol ester is polypropylene glycol monostearate.

9. The candle of claim 1 in which said drying agent is a saturated alcohol.

10. The candle of claim 1 in which said drying agent is a fatty amide.

11. The candle of claim 1 in which said drying agent is a fatty bis-amide.

12. The candle of claim 1 including 0.1% to 10% by weight of at least one fragrance selected from the group consisting of natural flavors and fragrances.

13. The candle of claim 1 including 0.1%–10% by weight of at least one fragrance selected from the group consisting of synthetic flavors and fragrance.

14. A clear transparent candle in a container, comprising a wick and a clear transparent combustible candle composition comprising 30–45 parts by weight of at least one polyamide resin; 30–45 parts by weight of at least one aliphatic acid alkyl ester having 16 to 40 carbon atoms total in the acid and alcohol moieties thereof; 10 to 30 parts by weight of at least one unsaturated alcohol having 11 to 20 carbon atoms; 10 to 30 parts by weight of at least one polyether diol ester; 5 to 15 parts by weight of at least one drying agent selected from the group consisting of saturated alcohols having 14 to 22 carbon atoms, fatty acid amides, and fatty acid bis-amides, 0 to 3 parts by weight of at least one emulsifier, 0 to 10 parts by weight of at least one fragrance and 0 to 1 part by weight of at least one preservative.

15. The candle of claim 14 in which the polyamide resin has the formula R—CO(NH—R'—NHCO—D—CO)n-NH—R'—NH—CO—R, in which n is a number from 1 to 20;

D independently at each occurrence an aliphatic or cycloaliphatic residue of a dicarboxylic acid having 2 to 54 carbon atoms, provided that in at least one occurrence D is the hydrocarbon moiety of dimer acid;

R' independently at each occurrence is a hydrocarbylene group having 2 to 12 carbon atoms, and R independently at each occurrence is a saturated or unsaturated aliphatic group having 7 to 25 carbon atoms or a cycloaliphatic group having 5 to 36 carbon atoms, and is terminated by a hydrogen atom (H) or a carboxyl group (COOH).

16. The candle of claim 15 in which R is an aliphatic group having 11 to 19 carbon atoms.

17. The candle of claim 15 in which R' is —CH2—CH2—.

18. The candle of claim 15 in which D in at least one occurrence is a hydrogenated hydrocarbon moiety of dimer acid.

19. The candle of claim 14 in which said aliphatic ester is 2-ethylhexyl stearate.

20. The candle of claim 14, in which said unsaturated alcohol is oleyl alcohol.

21. The candle of claim 14, in which said polyether diol ester is polypropylene glycol monostearate.

22. The candle of claim 14 in which said drying agent is a saturated alcohol.

23. The candle of claim 14 in which said drying agent is a fatty amide.

24. The candle of claim 14 in which said drying agent is a fatty bis-amide.

25. The candle of claim 14 including 0.1% to 10% by weight of at least one fragrance selected from the group consisting of natural flavors and fragrances.

26. The candle of claim 14 including 0.1%–10% by weight of at least one fragrance selected from the group consisting of synthetic flavors and fragrance.

27. A clear transparent combustible candle composition, comprising 40–55 parts by weight of at least one polyamide resin, 5–30 parts by weight of at least one aliphatic acid alkyl ester having 16 to 40 carbon atoms total in the acid and alcohol moieties thereof; 10 to 30 parts by weight of at least one unsaturated alcohol having 11 to 20 carbon atoms; 10 to 20 parts by weight of at least one polyether diol ester; 5 to 15 parts by weight of at least one drying agent selected from the group consisting of saturated alcohols having 14 to 22 carbon atoms, fatty acid amides, and fatty acid bis-amides, 0 to 3 parts by weight of at least one emulsifier, 0 to 10 parts by weight of at least one fragrance and 0 to 1 part by weight of at least one preservative.

28. A clear transparent combustible candle composition, comprising 35 parts by weight of at least one polyamide resin; 28 parts by weight of at least one aliphatic acid alkyl ester having 16 to 40 carbon atoms total in the acid and alcohol moieties thereof; 10 to 30 parts by weight of at least one unsaturated alcohol having 11 to 20 carbon atoms; 10 to 30 parts by weight of at least one polyether diol ester; 5 to 15 parts by weight of at least one drying agent selected from the group consisting of saturated alcohols having 14 to 22 carbon atoms, fatty acid amides, and fatty acid bis-amides, 0 to 3 parts by weight of at least one emulsifier, 0 to 10 parts by weight of at least one fragrance and 0 to 1 part by weight of at least one preservative.

* * * * *